(No Model.)
W. W. SNOW.
CAR WHEEL.
No. 276,727. Patented May 1, 1883.
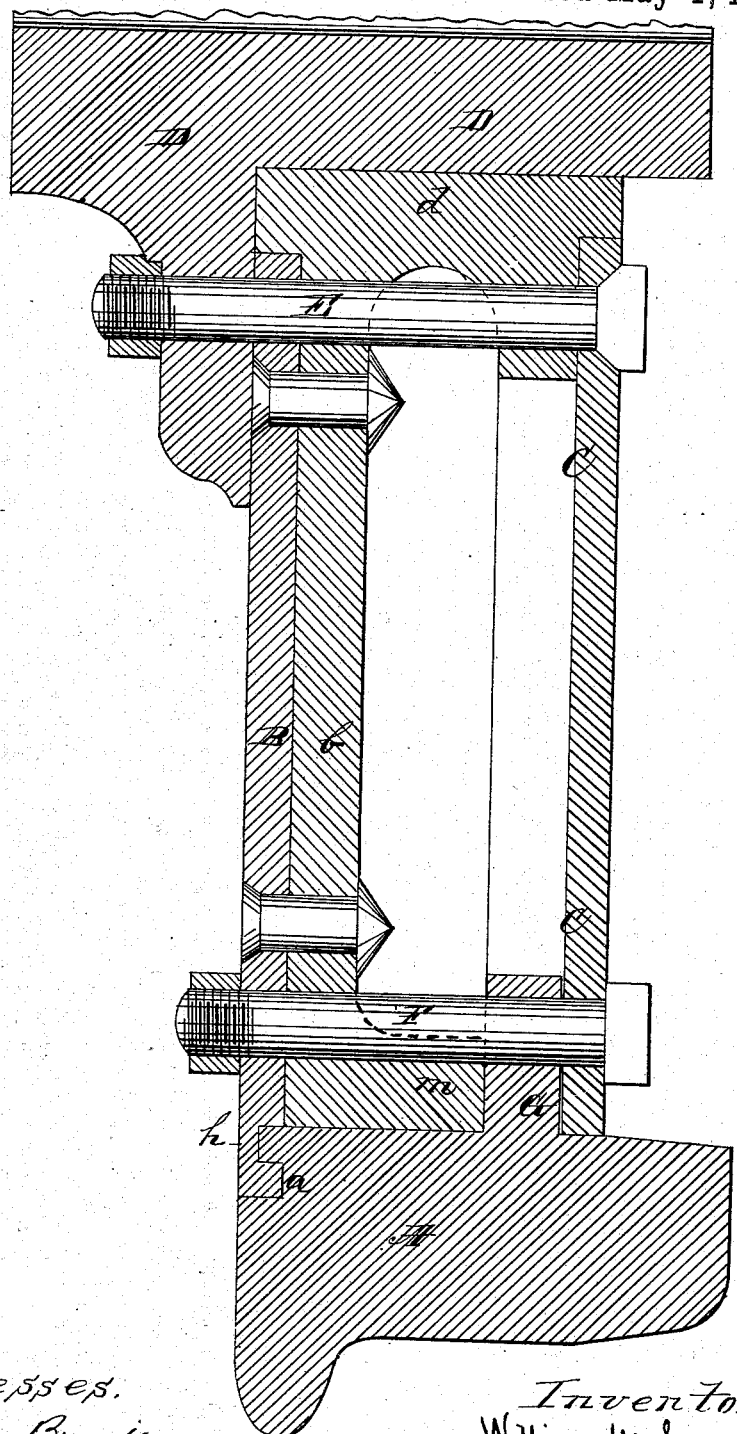
Witnesses.
W. Colborne Brookes
George H. Rehback
Inventor.
William W. Snow
by Wyllys Hodges atty

UNITED STATES PATENT OFFICE.

WILLIAM W. SNOW, OF RAMAPO, NEW YORK.

CAR-WHEEL.

SPECIFICATION forming part of Letters Patent No. 276,727, dated May 1, 1883.

Application filed February 10, 1883. (No model.)

*To all whom it may concern:*

Be it known that I, WILLIAM W. SNOW, of Ramapo, in the county of Rockland, State of New York, have invented a certain new and improved Car-Wheel, of which the following is a full, clear, and exact description, reference being had to the accompanying drawing, which represents a section of one-half of the wheel on the diameter from the axle-hole to the outer edge of the wheel.

The object of the invention is to secure a wheel which shall combine solidity, strength, and durability with economy of construction and facility of removal of the separate parts for repair, renewal, or change without endangering the unity or solidity of the rest of the wheel; and to this end I make the wheel of four principal parts with proper means to secure them together—that is to say, of the tire A, of the combined back plate and body, B b, as shown in the drawing, of a front plate or disk, C, and a flanged hub, D, the whole being united and secured by bolts E F.

The tire is made of the usual materials, preferably steel, and of the usual construction for wheels of this class, having, however, on its interior surface opposite the tread a flange projecting toward the hub, and upon its back side a rabbet, *a*, forming, with the flange *h* of the body, a tongue-and-groove joint. The tongue-and-groove joint might, however, be omitted for some purposes and the flange *h* simply be let into an annular groove on the inner back edge of the tire. I do not claim either the flange G or the groove or rabbet as my invention, both being old.

The essential features of the back plate or body, B b, are that it should be made of metal, iron or steel being the most suitable, that it should have a flange, *h*, bearing upon the back surface of the tire, with or without a tongue-and-groove joint, and a broad inwardly-projecting shoulder, *m*, which preferably reaches to and bears upon the flange G, being clamped thereon, as is also the flange *h* upon the rabbet *a* by the bolts F all round the wheel. This shoulder *m* receives the whole or main portion of the radial pressure between the hub and the tire and the jar and shock of the wheel. The body B b is secured to the tire, not only by the clamping action of the bolts, but is also shrunk on by the action of heat or driven on by hydraulic pressure. It can then be removed without disturbing the rest of the wheel by withdrawing the bolts F and plate C and reversing the process by which it was put on; but I do not claim this method of securing the tire to the body of the wheel. The plate C is the ordinary side or face plate, and its construction and application will be readily understood by reference to the drawing.

In putting the wheel together, when the tire and side plates have been united and bolted down, as described, it lacks only the hub D, and forms a solid whole, whereby it will be seen that the hub can be removed or inserted without disturbing the rest of the wheel.

As shown in the drawing, the body B b is made of two pieces and riveted together. By making in two pieces I secure the advantage of being able, if desired, to use two materials—as, for example, a wrought-iron plate, B, and a cast-iron body, *b*—and also economy of construction. The inner surface of this body-piece forms a central hole or bearing which receives the flanged hub D, and by this construction I obtain that the whole or the most of the radial pressure or thrust is borne at this point, also upon the broad thick surface made by another inwardly-projecting shoulder, *d*, of the body, instead of upon the thin edges of the side plates, such as C.

Car-wheels have been made with thin wrought-iron plates on both sides bolted to the tire and hub, and having but small bearing-surfaces on the edges of plates, which have a tendency to laminate and wear upon their edges under the jar and strain of actual use. By making my body-piece with the flange *h* and shoulder *m*, I secure the transverse bearing-surface of the flange on the back of the tire and of the shoulder *m* on the flange G, combined with a broad bearing for radial pressure or thrust upon the edges of the tire.

The plates and tire having been secured together, as described, the hub D D, of iron or steel, is then inserted, and it is important that it should fit so closely to the body-piece B b that it can only be inserted by the application of power, and this may be done by the hydraulic press commonly used in inserting the axle in the hub, and the hub is then secured by bolts E. It can be removed in the same way.

An important feature of the body B b is that it is so shaped and constructed as to present an unbroken edge to the hub when the latter is driven into it. Thus, as shown in the drawing, the part B is let into the part $b$, and does not run to the core of the hub, so that the latter, in driving, meets a clear unbroken surface. If, on the contrary, the surface of the part $d$ of the body presented the edges of two or more pieces to the surface of the core of the hub D when the latter is driven in, the unequal fitting of the parts, occasioned by unequal expansion and other causes, would present serious difficulties in the way of forming a close joint of this kind; and much more would this be the case if materials differing so greatly as metal and wood or paper were used for the body, as if the part B were made of metal and its edge bore upon the hub, the part $b$ being made of wood or paper. And thus it will be seen that I have secured a practically solid and firm wheel without welding, and of which either the tire or hub can be removed and replaced by the appliances ordinarily found in almost any railway repair-shop without endangering the solidity of the rest of the wheel.

Wheels have been made heretofore having metal side plates secured to the tire and hub by bolting or otherwise, and having a filling or stuffing of paper, wood, and similar materials, not secured to the side plates, to deaden the jar or vibration; but from the method of securing the parts together, and the fact that such materials do not admit of a close union to the hub and tire under pressure that metal does when in one solid piece, they do not form a solid portion of the wheel in the same sense as the metal body B $b$, and an undue strain is placed upon the side plates and bolts.

The hub D may be made to taper a little from the flange to the inner end, but would ordinarily be constructed of a cylindrical form. I do not claim broadly a wheel composed of four parts—that is, of the tire, hub, and two intermediate pieces—nor do I claim such a wheel when the space between the intermediate pieces is stuffed or filled with paper, wood, or similar materials, my invention resting mainly upon the peculiar construction and quality of the intermediate piece, B $b$, and its connection with the tire and hub.

I do not claim a wheel composed of a tire and hub or central piece, however secured together; nor do I claim a wheel in which a tire is secured to a solid central part by means of a rabbeted flange on the latter, the central part being bolted to a flange in the center of the tire and the parts shrunk or pressed together when the broad bearing-surface $m$ is nearer the edge of the tire than the body of the intermediate piece projecting outwardly instead of inwardly, such a wheel differing from mine in the fact that the resistance between the tire and hub is in the middle of the tire instead of upon its edges, the body-piece in my wheel having essential advantages in its manufacture, and being separate from the hub, which is removable. The flange $h$ is a part of the body B $b$, and not made of a separate ring rabbeted or bolted to both tire and body to secure them together.

What, then, I do claim is—

1. In a car-wheel, the combination of the tire A, the separate metal body B $b$, the flange $h$ upon its outer edge, the inwardly-projecting shoulder $m$, the extended bearing-surface $d$, presenting an unbroken edge to the core of the hub D, and the hub D, provided with a flange bearing upon the outer surface only of the body, substantially as and for the purpose described.

2. In a car-wheel, the combination of the tire A, the separate metal body B $b$, the flange $h$ upon its outer edge, the tongue-and-groove joint, the inwardly-projecting shoulder $m$, the extended bearing-surface $d$, presenting an unbroken edge to the core of the hub D, and the hub D, provided with a flange bearing upon the outer surface only of the body, substantially as and for the purpose described.

3. In a car-wheel, the combination of the tire A, the separate metal body B $b$, the extended bearing-surface $d$, presenting an unbroken edge to the core of the hub D, with its flange bearing upon the outer surface only of the body, and core making a driven joint with the edge of the body B $b$, substantially as described.

4. A car-wheel composed of the tire A, provided with a flange, G, and the annular groove $a$, the body B $b$, the shoulder $m$, and flange $h$, and extended inner bearing-surface, $d$, the plate C, and hub B, the whole united by bolts, and the hub and tire, or either of them, making a driven joint with the body.

WILLIAM W. SNOW.

Witnesses:
JAMES F. LEIGHTON,
JOHN W. BURROUGHS.